United States Patent [19]

Wildfang

[11] Patent Number: 4,862,913
[45] Date of Patent: Sep. 5, 1989

[54] CHECK VALVE

[75] Inventor: Dieter Wildfang, Müllheim, Fed. Rep. of Germany

[73] Assignee: Dieter Wildfang KG, Mëllheim, Fed. Rep. of Germany

[21] Appl. No.: 216,319

[22] Filed: Jul. 7, 1988

[30] Foreign Application Priority Data

Jul. 9, 1987 [DE] Fed. Rep. of Germany ....... 3722665

[51] Int. Cl.$^4$ .............................................. F16K 15/06
[52] U.S. Cl. .................................. 137/543; 137/516.29
[58] Field of Search ................... 137/542, 543, 543.19, 137/516.29

[56] References Cited

U.S. PATENT DOCUMENTS

| 1,086,549 | 2/1914 | Miller | 137/543 |
|---|---|---|---|
| 1,616,819 | 2/1927 | Norris | 137/543 |
| 1,890,223 | 12/1932 | Kilzer | 137/543 X |
| 2,800,142 | 7/1957 | Champion . | |
| 2,918,083 | 12/1959 | Clark . | |
| 4,535,808 | 8/1985 | Johanson | 137/543 |

FOREIGN PATENT DOCUMENTS 1697174 1/1955 Fed. Rep. of Germany .
6610152 4/1966 Fed. Rep. of Germany .

Primary Examiner—Robert G. Nilson
Attorney, Agent, or Firm—Peter K. Kontler

[57] ABSTRACT

A check valve wherein a tubular housing confines a reciprocable valving element which is biased by a spring so that it normally engages a seat between the inlet and the outlet of the housing. The valving element is guided by a plastic core which is installed in the housing and has axially parallel guide members for the head of the valving element. One end of each guide member is integral with an annular stabilizing section which is received in a complementary internal socket of the housing, and the other end of each guide member is integral with an annular main section which is coupled to the housing by male and female detent members. The main section surrounds a sleeve-like bearing which guides a shank of the valving element.

25 Claims, 2 Drawing Sheets

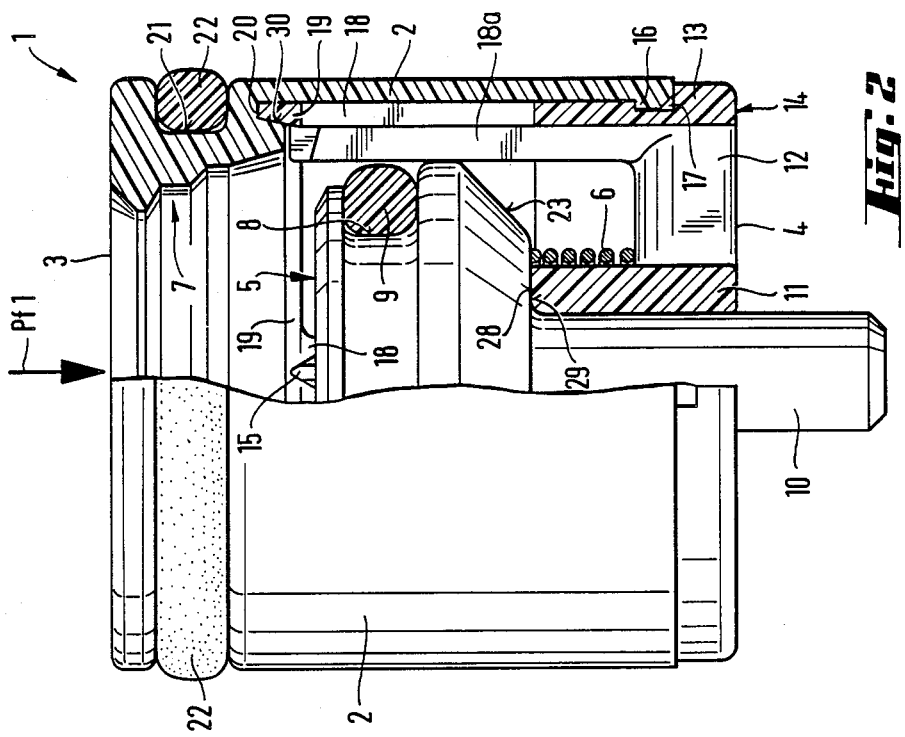
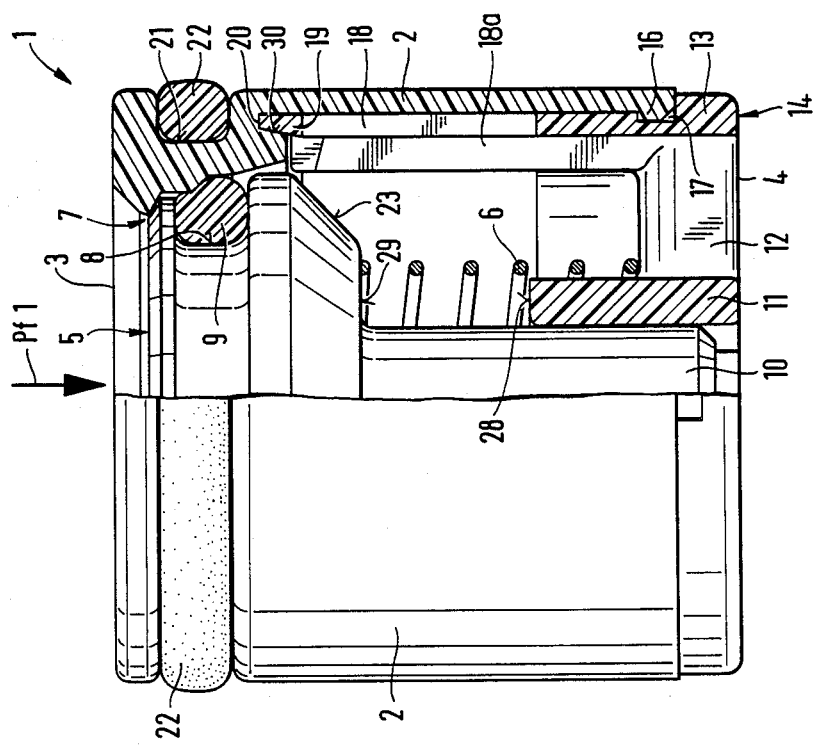

CHECK VALVE

BACKGROUND OF THE INVENTION

The invention relates to check valves in general, and more particularly to improvements in check valves of the type wherein a tubular housing confines a reciprocable valving element which is biased against an internal seat of the housing by a spring or the like so that the valving element normally seals the fluid-admitting inlet of the housing from the fluid-discharging outlet. Still more particularly, the invention relates to improvements in check valves of the type wherein the housing further contains a core with guide members for the valving element.

In presently known check valves of the above outlined character, the core has a single annular section which is connected with the housing and has a set of prong-like guide members which are adjacent the internal surface of the housing and serve to confine the valving element to reciprocatory movements between its sealing and open positions. When in sealing position, the valving element prevents the flow of a fluid through the housing in either direction, and the valving element invariably prevents the flow of a fluid in a direction from the outlet toward the inlet of the housing. Thus, if the pressure at the inlet of the housing is less than at the outlet, the spring automatically shifts the valving element into engagement with the seat so that no fluid can enter, by way of the check valve, a conduit which serves to supply fluid to the inlet of the housing.

Champion U.S. Pat. No. 2,800,142 discloses a check valve wherein the core has a number of axially parallel prongs which serve to guide the valving elements and each of which has a free end remote from the annular section of the core A drawback of the patented valve is that the core occupies too much space in the housing because it must be provided with a large number of sturdy and bulky guide members. The guide members must be sturdy and bulky because only one end of each such guide member is integral with an annular part of the core. Moreover, the guide members offer a rather pronounced resistance to the flow of a fluid through the housing of the patented check valve in open position of the valving element. If the guide members are made of a thermoplastic material, they are likely to undergo undesirable deformation in response to heating by the conveyed fluid or by the housing of the check valve; this can affect the accuracy of guidance and can lead to jamming of the valving element. Thermally induced expansion of the guide members also promotes jamming of the valving element. On the other hand, the clearances between the guide members and the adjacent portions of the valving element cannot be too pronounced because radial stray movements of the valving element can result in the generation of noise. Guide members of thermoplastic material exhibit the additional drawback that they are prone to deformation immediately after they leave an extruder or another making machine, and such prong-like guide members are likely to become entangled with the guide members of neighboring cores during storage and/or during transport to the machines which are used to insert the cores into the corresponding housings.

A check valve with a modified core or cage member for the reciprocable valving element is disclosed in Clark et al. U.S. Pat. No. 2,918,083. The prong-like guide members of the core have inwardly bent tips which are anchored in the housing. The other end of each guide member is integral with a disc-shaped bottom wall which serves as a retainer for the valve spring.

German Utility Model No. 66 10 152 (owned by the assignee of the present application) discloses a check valve wherein only the shank of the reciprocable valving element is guided, namely by a sleeve-like bearing which is installed in the housing adjacent the outlet.

German Utility Model No. 16 97 174 of Sandmann discloses a check valve wherein the housing is provided with integral internal ribs which serve to guide the reciprocable valving element.

OBJECTS OF THE INVENTION

An object of the invention is to provide a novel and improved check valve wherein the valving element is guided in such a way that it does not generate any, or any noticeable, noise and undergoes a minimum of wear.

Another object of the invention is to provide a novel and improved core for use in the above outlined check valve.

A further object of the invention is to provide a novel and improved housing for use in the above outlined valve.

An additional object of the invention is to provide a novel and improved valving element for use in the above outlined valve.

Still another object of the invention is to provide a check valve whose components can be mass-produced in automatic machines and can be automatically assembled with each other.

A further object of the invention is to provide a check valve wherein the valving element is held against any, or against appreciable, radial vibratory and/or other stray movements in a novel and improved way.

An additional object of the invention is to provide a core which is designed in such a way that it can adequately guide the valving element even if it is not produced with a very high degree of precision.

Another object of the invention is to provide a compact, simple and inexpensive check valve which can be used as a superior substitute for heretofore known check valves.

An additional object of the invention is to provide the check valve with a readily replaceable core and with a readily replaceable valving element.

SUMMARY OF THE INVENTION

The invention is embodied in a check valve which comprises a substantially tubular housing having an inlet in the region of one of its ends, an outlet which is remote from the inlet and can be disposed at the other end of the housing, and an annular internal seat between the inlet and the outlet. The valve further comprises a valving element (e.g., in the form of a piston) which is reciprocable in the housing along a predetermined path toward and away from the seat, and a coil spring and/or other suitable means for yieldably biasing the valving element against the seat so that the valving element normally seals the inlet from the outlet of the housing. The valve also comprises a core which includes a cage for the valving element. In accordance with a feature of the invention, the cage comprises an annular stabilizing section in the housing and a plurality of elongated guide members for the valving element. Each guide member has a first end which is rigid with and a second end which is remote from the stabilizing section. The latter is disposed between the inlet of the housing and the guide members. For example, the stabilizing section can be installed in the housing adjacent the seat and the guide members then extend from the stabilizing section toward the outlet of the housing.

The housing is preferably provided with an internal annular socket for the stabilizing section of the cage, and the cage preferably further comprises a second annular section which is rigid with the second ends of the guide members. The cage can resemble a hollow cylinder with two coaxial annular sections and a set of axially parallel guide members between the two annular sections The second annular section of the cage is preferably secured to and preferably extends (at least in part) into the housing of the check valve. The stabilizing section is preferably a snug fit in the internal socket of the housing. The latter can be provided with an internal surface which is surrounded by the socket and diverges in a direction from the outlet toward the inlet, and the stabilizing section can be provided with a complementary surface which abuts the internal surface when the stabilizing section is properly received in its socket. The two surfaces cooperate to facilitate introduction of the stabilizing section into the socket. In accordance with a presently preferred embodiment, the seat for the valving element is disposed between the inlet and the socket of the housing.

The core of the improved check valve preferably further comprises an annular bearing (e.g., in the form of a sleeve) which is spacedly surrounded by the second annular section of the cage and serves to reciprocably receive and guide a coaxial shank of the valving element. Such core can further comprise ribs which connect the bearing with and center the bearing relative to the second annular section of the cage. Each rib is preferably coplanar with one of the guide members (provided, of course, that the number of ribs matches that of the guide members).

The configuration of the valving element and the mutual spacing of the seat and socket in the housing are preferably selected in such a way that the valving element is out of contact with the guide members when it abuts the seat. In order to ensure that the valving element is properly centered between the guide members, it is preferably provided with a conical external surface which converges in a direction from the inlet toward the outlet of the housing and comes into engagement with the guide members in response to movement of the valving element away from the seat. The aforementioned shank of the valving element extends beyond the external surface of the valving element in a direction toward the other end of the housing, i.e., away from the inlet.

Each guide member can have a substantially T-shaped cross-sectional outline, and each such guide member preferably includes a web which extends in the circumferential direction of the housing and a leg which extends from the respective web radially inwardly toward the valving element.

The number of guide members preferably exceeds two. For example, the cage of the core can comprise four equidistant guide members which are parallel to the axis of the valving element. The guide members are preferably integral with the stabilizing and/or second annular section of the cage.

The means for securing the second annular section of the cage to the housing preferably comprises cooperating male and female detent means. The male detent means can comprise an internal bead at that end of the housing which is remote from the inlet, and the female detent means can comprise a complementary groove which is provided in the second annular section of the cage and receives the bead when the core is properly installed in the housing.

The valve preferably further comprises means for limiting the extent to which the valving element is movable away from its seat, and such limiting means can comprise a surface which is provide on the aforementioned bearing of the core and confronts the seat.

The novel features which are considered as characteristic of the invention are set forth in particular in the appended claims. The improved check valve itself, however, both as to its construction and its mode of operation, together with additional features and advantages thereof, will be best understood upon perusal of the following detailed description of certain specific embodiments with reference to the accompanying drawing.

BRIEF DESCRIPTION OF THE DRAWING

FIG. 1 is a partly elevational and partly axial sectional view of a check valve which embodies the invention, the valving element being shown in sealing position;

FIG. 2 is a similar partly elevational and partly sectional view but showing the valving element in open position;

DESCRIPTION OF PREFERRED EMBODIMENTS

Figure 3:
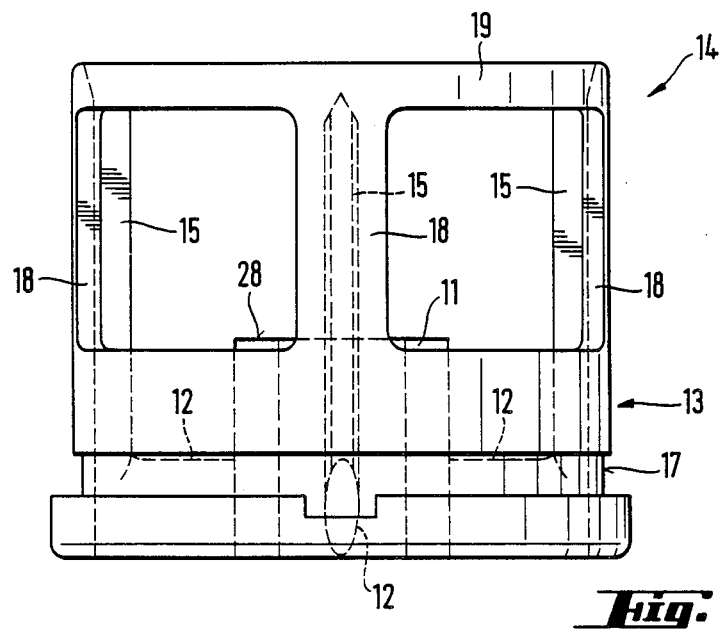
FIG. 3 is an elevational view of the core of the valve which is shown in FIGS. 1 and 2.

Referring first to FIGS. 1 and 2, there is shown a check valve 1 which comprises a tubular housing 2 with an inlet 3 at one end and an outlet 4 at the other end. For example, the housing 2 can be installed at the discharge end of a conduit which can supply a hydraulic or gaseous fluid in the direction of arrow Pf1. The purpose of the valve 1 is to prevent a fluid from flowing through the housing 2 in a direction counter to that which is indicated by the arrow Pf1.

The housing 2 has an internal annular seat 7 which is normally engaged by the head of a valving element 5 resembling a piston and being reciprocable in the housing in and counter to the direction of arrow Pf1. A coil spring 6 is provided to serve as a means for yieldably biasing the valving element 5 against the seat 7 so that the valving element then seals the inlet 3 from the outlet 4 of the housing 2. The head of the valving element 5 is provided with a circumferentially complete groove 8 for an 0-ring 9 or another suitable sealing device which comes into direct contact with the surface bounding the seat 7 in the housing 2 when the coil spring 6 is free to expand and to maintain the valving element 5 in the sealing position of FIG. 1. A shank 10 of the valving element 5 extends in a direction toward the outlet 4 and can actually project from the housing 2 when the element 5 approaches or reaches its fully open position which is shown in FIG. 2. At such time, the fluid which is delivered in the direction of arrow Pf1 flows around the head of the valving element 5 and issues from the housing 2 by way of the outlet 4. The shank 10 is reciprocable in a sleeve-like bearing 11 which forms part of the improved core 14 for the valving element 5. The bearing 11 further serves as a means for centering the convolutions of the coil spring 6 and has a flat surface 28 which confronts the seat 7 and constitutes a means for limiting the extent to which the valving element 5 can move in a direction away from the seat, i.e., the surface 28 determines the fully open position of the valving element. The latter has an annular surface 29 which abuts the surface 28 in the open position of FIG. 2. The valving element 5 can leave the sealing position of FIG. 1 in response to the pressure of fluid which is delivered in the direction of arrow Pf1 or in any other conventional way, e.g., in response to energization of an electromagnet which can pull it away from the seat 7 or in response to a pull upon the shank 10.

The core 14 further comprises a cage composed of an annular stabilizing section 19 in the interior of housing 2, a second annular section 13 at the outlet 4 of the housing, and a plurality of axially parallel guide members 15 each of which has a first end integral with the annular section 19 and a second end integral with the annular section 13. The section 19 serves to stabilize the cage and the entire core 14 and is received in an annular socket 20 which is provided therefor in the housing 2 intermediate the seat 7 and the outlet 4, preferably close or very close to the seat 7. The second annular section 13 can be said to constitute the main component part of the cage and of the entire core 14, and is connected with the bearing 11 by a set of radially extending ribs 12 which center the bearing within the section 13 and each of which is preferably coplanar with one of the guide members 15. The members 15 serve to guide the head of the valving element 5 in the major part of the aforementioned path, namely during movement of the element 5 from the open position of FIG. 2 close to the sealing position of FIG. 1 and vice versa. The entire core 14 (including the sleeve-like bearing 11, the ribs 12, the annular section 13, the guide members 15 and the annular stabilizing section 19) is preferably made of a single piece of a suitable plastic material, e.g., in an extruding or other conventional machine for making shaped articles from plastic materials.

The head of the valving element 5 has a frustoconical external surface 23 which comes into contact with the radially innermost portions of the guide members 15 during the initial stage of movement of the valving element from the sealing position of FIG. 1, and a cylindrical peripheral surface 40 which remains in engagement with the radially innermost portions of the members 15 during the remaining stage of movement of the valving element toward the position of FIG. 2. It will be noted that the valving element 5 is confined to reciprocatory movement along a predetermined path partly by the bearing 11 which receives the shank 10 and also by the guide members 15 which engage its head in nearly all positions except when the head actually seals the inlet 3 from the outlet 4 of the housing 2.

The purpose of the stabilizing section 19 is to ensure that the guide members 15 are properly oriented in the interior of the housing 2 as soon as the section 19 is properly received in the socket 20. The arrangement is preferably such that the section 19 is a snug or tight fit in the socket 20, i.e., the latter is filled by the section 19 when the core 14 is properly installed in the housing 2. Introduction of the stabilizing section 19 into the socket 20 is facilitated by a conical surface 30 which is provided in the housing 2 and is surrounded by the socket 20; such surface is engaged by a complementary internal surface of the section 19. The surface 30 diverges in a direction from the outlet 4 toward the inlet 3 of the housing 2, i.e., in the direction of insertion of the core 14. Since one end of each guide member 15 is integral with the stabilizing section 19, the latter prevents the respective ends of the guide members from flexing inwardly or outwardly, especially immediately after the core 14 leaves an extruder or another mass-producing machine. In addition, the section 19 facilitates automatic introduction of the core 14 into the housing 2. Still further, the section 19 prevents entanglement of guide members 15 on neighboring cores 14 when such cores are gathered upon expulsion from the extruder and prior to introduction into discrete housings 2. In the absence of the stabilizing sections 19, the guide members 15 of neighboring cores 14 would be likely to become entangled in a magazine or hopper and/or on the way from the maker to the automatic inserter of cores into housings 2.

The second or main annular section 13 of the core 14 is secured to the adjacent end of the housing 2 at an optimum distance from the socket 20 so that, when the socket receives the stabilizing section 19 and the section 13 is properly secured to the housing 2, the guide members 15 extend in parallelism with the axis of the housing 2 and are in optimum positions to guide the head of the valving element 5 on its way toward or from the open position of FIG. 2. Each properly inserted and oriented guide member 15 abuts the internal surface of the housing 2 so that its radially innermost portion is located at an optimum distance from the axis of the shank 10 to ensure predictable and reliable guidance of the head of the valving element 5. The housing 2 can be said to constitute a back support for the radially outermost portions of the guide members 15. The just described design of the core 14 compensates for at least some manufacturing tolerances. Proper orientation and retention of guide members 15 in optimum positions with reference to the head of the valving element 5 is particularly important if the plastic material of the members 15 tends to soften in response to heating, either by a medium which surrounds the housing 2 or by the medium which flows in the direction of arrow Pf1 in the open position of the valving element 5.

Accurate guidance of the valving element 5 is desirable and advantageous for a number of reasons. Thus, the absence of excessive play reduces the wear and prolongs the useful life of the valving element 5 and core 14. Furthermore, absence of wobbling, vibratory and/or other stray movements of the valving element 5 in the radial direction of the housing 2 reduces the likelihood of the generation of noise. Moreover, the valving element 5 is much less likely to jam in an intermediate position or in the open position of FIG. 2.

The guide members 15 can form part of a cage for a valving element which has a circular or polygonal head. A circular head is preferred because it can be mass-produced at a lower cost. In addition, such valving elements can be mass-produced with a very high degree of precision. This is important for the aforediscussed reasons, particularly as regards the reduction of wear upon the valving element and the core 14, as well as because the element 5 is more likely to reliably seal the path between the inlet 3 and the outlet 4 of the housing when its sealing ring 9 engages the seat 7.

It is also within the purview of the invention to guide the shank 10 of the valving element 5 in a sleeve-like or ring-shaped bearing which is not an integral part of the core 14. However, the illustrated core 14 (wherein the bearing 11 is integrally connected with the annular section 13 by radially extending ribs 12) is preferred at this time because of its simplicity and lower cost. In addition, assembly of the check valve 1 takes up much less time because the bearing 11 is properly located within the section 13 in automatic response to introduction of the stabilizing section 19 into the socket 20. The aforementioned distribution of ribs 12 (namely that each such rib is coplanar with one of the guide members 15) is desirable and advantageous because this ensures that the ribs 12 offer a minimum of resistance to the flow of a fluid medium from the seat 7 toward and into the outlet 4 in the open position of the valving element 5.

The length of the guide members 15 is preferably selected in such a way that they engage and adequately guide the head of the valving element 5 in the open position of the valving element as well as in nearly all intermediate positions except those which are immediately or closely adjacent the sealing position of FIG. 1. This ensures that the head of the valving element 5 can be centered by the seat 7 when the valving element assumes the end position of FIG. 1. Such centering enhances the sealing action of the valving element 5. The aforementioned conical surface 23 ensures that the head of the valving element 5 automatically finds its way into the space which is surrounded by the guide members 15 as soon as the valving element 5 begins to move from the sealing position of FIG. 1.

Figure 4:
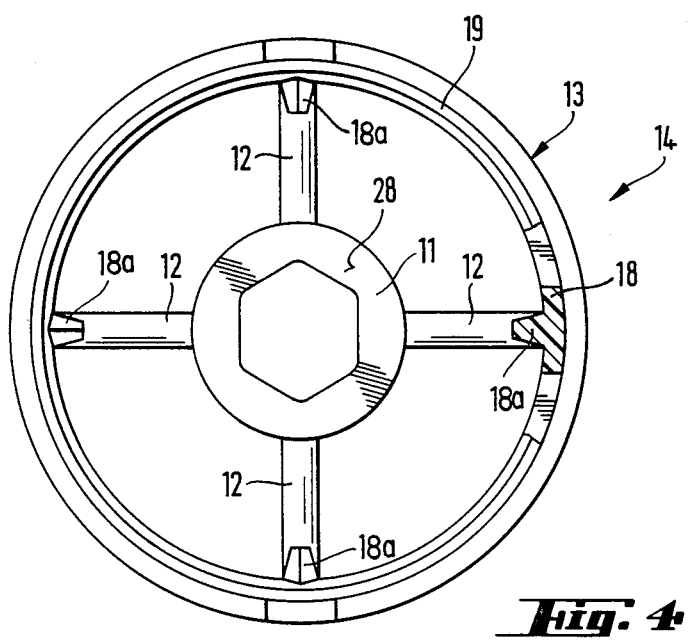
FIG. 4 is a plan view of the core.

As can be best seen in FIG. 3, each of the illustrated guide members 15 has a substantially T-shaped cross-sectional outline and includes a web 18 which extends in the circumferential direction of the housing 2 (when the core 14 is properly installed in the housing) and a leg 18a which extends from the central portion of the inner side of the web 18 toward the axis of the valving element 5. It has been found that a guide member which has a T-shaped cross-sectional outline can stand pronounced bending and other deforming stresses which are likely to develop during insertion of the core 14 into the housing 2 as well as in actual use of the improved check valve 1. The width of the legs 18a can decrease in a-direction radially inwardly and away from the respective webs 18. This can be seen in FIG. 4. Such design of the guide members 15 is desirable and advantageous because the guide members offer less resistance to the flow of a fluid medium from the seat 7 toward the outlet 4 of the housing 2 without affecting their ability to withstand the expected bending and other deforming stresses.

FIGS. 1 and 2 further show one presently preferred mode of facilitating installation of the housing in a conduit, in a pipeline or the like. Thus, the external surface of the housing 2 is provided with a circumferentially complete groove 21 for a sealing ring 22 which engages the internal surface of the conduit or pipeline when the housing 2 is properly installed therein. It is clear that the housing can be installed in a conduit or the like in many other ways. For example, the housing can be provided with an internal or external thread to mate with a complementary external or internal thread of a conduit or the like.

The number of guide members 15 can be varied within a wide range. It is preferred to utilize a cage which has at least three equidistant guide members 15. The illustrated core 14 has a cage with four equidistant guide members 15. The number of guide members 15 need not be much larger because this would merely increase the number of surfaces which would be likely to gather deposits of calcium or other substances which are entrained by the conveyed fluid without appreciably enhancing the guidance of the valving element 5. Furthermore, the cage including the annular sections 13, 19 and the guide members 15 offers less resistance to the flow of fluid if the number of guide members is not excessive. Excessive depositions of calcium or other substances on the guide members 15 could lead to jamming of the valving element 5 in the open position or in an intermediate position. Still further, the number of guide members 15 can be relatively small because the valving element 5 is also guided by the bearing 11.

The means for securing the core 14 to the housing 2 comprises a male detent member 16 in the form of an annular bead which surrounds the outlet 4 of the housing 2, and a female detent member 17 in the form of a complementary groove which is provided in the external surface of the annular section 13 adjacent an external shoulder which abuts the adjacent end face of the housing. If the core 14 is not bonded or otherwise permanently secured to the housing 2, the detent members 16, 17 should ensure that the surface 28 of the bearing 11 can invariably arrest the valving element 5 in the fully open position of FIG. 2.

The core 14 can be said to resemble a cap whose circumferentially extending wall is composed of the sections 13, 19 and guide members 15, and whose bottom wall is composed of the sleeve-like bearing 11 and ribs 12. The number of openings in the walls of such cap-like body is minimal, e.g., a total of five openings in the bottom wall (including the four openings between the ribs 12 and the preferably polygonal axial passage of the bearing 11 for the shank 10), and four openings between the webs 18 of the guide members 15 of the cylindrical wall. The core 14 does not have any outwardly projecting parts which would be likely to become entangled with the projecting parts of neighboring cores and/or which would contribute to complexity of automatic introduction of cores into housings 2.

An important advantage of the improved check valve is its simplicity and hence low cost. Furthermore, the core 14 is compact even though it ensures a much more reliable guidance of the valving element 5 than heretofore known cores which do not have any stabilizing means for the guide members. Still further, eventual manufacturing tolerances do not affect the ability of the core 14 to adequately guide the valving element, and the guide members 15 can reliably prevent radial stray movements of the valving element and thus reduce the likelihood of the generation of noise. In addition, the wear upon the valving element 5, housing 2 and/or core 14 is minimal because the valving element is confined to reciprocatory movements along a predetermined path.

The stabilizing section 19 constitutes a very simple, compact and inexpensive means for preventing stray movements of the adjacent ends of the guide members 15 during removal from the making machine, during storage, during transport and/or during assembly of cores 14 with housings 2. Moreover, the stabilizing section 19 facilitates introduction of the core 14 into the housing 2 and ensures that the guide members 15 are properly oriented relative to the head of the valving element 5. This, in turn, ensures that the valving element 5 is not likely to jam as well as that the valving element is held against stray movements in the radial direction of the housing 2. The stabilizing section 19 renders it possible to reduce the dimensions and/or the total number of guide members so that the bulk and weight of the improved core 14 need not exceed the bulk and/or weight of a conventional core which does not have an equivalent of the stabilizing section 19. In fact, the outer dimensions (such as maximum diameter and maximum length) need not exceed those of conventional cores without stabilizing sections.

The aforediscussed feature that the ribs 12 are coplanar with the nearest guide members 15 not only reduces the resistance of the core 14 to the flow of a fluid medium in the open position of the valving element 5 but also simplifies the making of the core.

While it is also within the purview of the invention to design the guide members 15 in such a way that they contact the head of the valving element 5 when the latter assumes the sealing position of FIG. 1, the illustrated design is preferred because this prevents multiple guidance of the head in the sealing position of the valving element, i.e., such head is then guided only by the seat 7 of the housing 2.

Without further analysis, the foregoing will so fully reveal the gist of the present invention that others can, by applying current knowledge, readily adapt it for various applications without omitting features that, from the standpoint of prior art, fairly constitute essential characteristics of the generic and specific aspects of my contribution to the art and, therefore, such adaptations should and are intended to be comprehended within the meaning and range of equivalence of the appended claims.

I claim:

1. A check valve comprising a substantially tubular housing having an inlet in the region of one end, an outlet remote from said inlet and an internal seat between said inlet and said outlet; a valving element reciprocable in said housing along a predetermined path toward and away from said seat; means for yieldably biasing said element against said seat so as to seal said inlet from said outlet; and a core including a cage for said element, said cage comprising an annular stabilizing section in said housing and a plurality of elongated guide members for said element, each of said guide members having a first end rigid with and a second end remote from said stabilizing section, and said stabilizing section being disposed between said inlet and said guide members, said housing having an internal annular socket for said stabilizing section and an internal surface which is surrounded by said socket and diverges in a direction from said outlet toward said inlet, said stabilizing section having a complementary surface which abuts said internal surface.

2. The valve of claim 1, wherein said cage further comprises a second annular section which is rigid with the second ends of said guide members.

3. The valve of claim 2, wherein the second annular section of said cage is secured to and at least a portion thereof extends into said housing.

4. The valve of claim 1, wherein said seat is disposed between said inlet and said socket.

5. The valve of claim 1, wherein said cage further comprises a second annular section which is rigid with the second ends of said guide members, said core further comprising an annular bearing which is surrounded by said second annular section and said valving element having a shank which is reciprocable in said bearing.

6. The valve of claim 5, wherein said core further comprises ribs which are integral with said bearing and with said second annular section.

7. The valve of claim 5, wherein said core further comprises ribs which connect said bearing with said second annular section, each of said ribs being coplanar with one of said guide members.

8. The valve of claim 1, wherein said guide members are spaced from said valving element when the latter abuts said seat.

9. The valve of claim 8, wherein said valving element has an external surface which converges in a direction from said inlet toward said outlet and engages said guide members in response to movement of the valving element away from said seat.

10. The valve of claim 9, wherein said valving element includes a shank and said core further comprises a bearing reciprocably receiving said shank, said shank extending from said external surface in a direction away from said inlet.

11. The valve of claim 1, wherein said guide members have substantially T-shaped cross-sectional outlines.

12. The valve of claim 1, wherein the number of said guide members exceeds two.

13. The valve of claim 12, wherein said guide members are substantially equidistance from each other in the circumferential direction of said tubular housing.

14. The valve of claim 13, where in said cage comprises four guide members.

15. The valve of claim 13, wherein said guide members are integral with said stabilizing section.

16. The valve of claim 1, wherein said core and said housing have cooperating male and female detent means.

17. The valve of claim 1, wherein said core further comprises means for limiting the extent to which the valving element is movable in a direction away from said seat.

18. The valve of claim 17, wherein said core further comprises a bearing and said valving element includes a shank which is reciprocable in said bearing, said bearing having surface confronting said seat and constituting said limiting means.

19. A check valve comprising a substantially tubular housing having an inlet in the region of one end, an outlet remote from said inlet and an internal seat between said inlet and said outlet; a valving element reciprocable in said housing along a predetermined path toward and away from said seat; means for yieldably biasing said element against said seat so as to seal said inlet from said outlet; and a core including a cage for said element, said cage comprising an annular stabilizing section in said housing and a plurality of elongated guide members for said element, said guide members having substantially T-shaped cross-sectional outlines, and each of said guide members having a web extending substantially circumferentially of the valving element and a leg extending radially inwardly from the respective web and toward the valving element, each of said guide members further having a first end rigid with and a second end remote from said stabilizing section, and said stabilizing section being disposed between said inlet and said guide members, said housing having an internal annular socket for said stabilizing section.

20. A check valve comprising a substantially tubular housing having an inlet in the region of one end, an outlet remote from said inlet and an internal seat between said inlet and said outlet; a valving element reciprocable in said housing along a predetermined path toward and away from said seat; means for yieldably biasing said element against said seat so as to seal said inlet from said outlet; and a core including a cage for said element, said cage comprising an annular stabilizing section in said housing and a plurality of elongated guide members for said element, each of said guide members having a first end rigid with and a second end remote from said stabilizing section, and said cage further comprising a second annular section which is rigid with the second ends of said guide members, said core and said housing having cooperating male and female detent means, and one of said detent means being provided on said second annular section, said stabilizing section being disposed between said inlet and said guide members, and said housing having an internal annular socket for said stabilizing section.

21. The valve of claim 20, wherein said housing has an internal annular socket for said stabilizing section.

22. The valve of claim 21, wherein said stabilizing section is a snug fit in said socket.

23. A check valve comprising a substantially tubular housing having an inlet in the region of one end, an outlet remote from said inlet and an internal seat between said inlet and said outlet; a valving element reciprocable in said housing along a predetermined path toward and away from said seat; means for yieldably biasing said element against said seat so as to seal said inlet form said outlet; and a core including a cage for said element, said cage comprising an annular stabilizing section in said housing and a plurality of elongated guide members for said element, each of said guide members having a first end rigid with and a second end remote from said stabilizing section, said stabilizing section being disposed between said inlet and said guide members, said core and said housing having cooperating male and female detent means, and said male detent means comprising an internal bead provided in said housing remote from said seat, said female detent means including a complementary groove provided on said core and receiving said bead, and said housing having an internal annular socket for said stabilizing section.

24. The valve of claim 23, wherein said housing has another end remote from said inlet, said outlet being disposed at said other end of the housing and said bead surrounding said outlet, said cage further comprising a second annular section rigid with the second ends of said guide members and being provided with said groove.

25. A check valve comprising a substantially tubular housing having an inlet in the region of one end, an outlet remote from said inlet and an internal seat between said inlet and said outlet; a valving element reciprocable in said housing along a predetermined path toward and away from said seat; means for yieldably biasing said element against said seat so as to seal said inlet from said outlet; and a core including a cage for said element, said cage comprising an annular stabilizing section in said housing and a plurality of elongated guide members for said element, each of said guide members having a first end rigid with and a second end remote from said stabilizing section, and said stabilizing section being disposed between said inlet and said guide members, said housing having an internal annular socket for said stabilizing section and an internal surface which is surrounded by said socket and diverges in a direction from said outlet toward said inlet, said stabilizing section being a snug fit in said socket and having a complementary surface which abuts said internal surface.

* * * * *